US005093157A

United States Patent [19]

Miyamoto

[11] Patent Number: 5,093,157

[45] Date of Patent: Mar. 3, 1992

[54] METHOD FOR MAKING DRESSED MATERIALS AND SAID DRESSED MATERIALS

[75] Inventor: Ichiro Miyamoto, Tokyo, Japan

[73] Assignee: Miyamoto Toryo Co., Ltd., Tokyo, Japan

[21] Appl. No.: 583,833

[22] Filed: Sep. 17, 1990

[51] Int. Cl.[5] .............................. G05D 5/00

[52] U.S. Cl. .............................. 427/256; 427/258; 427/262; 427/263

[58] Field of Search .............. 427/256, 258, 262, 263

[56] References Cited

U.S. PATENT DOCUMENTS 4,910,052 3/1990 Caldwell .............................. 156/60

*Primary Examiner*—Patrick J. Ryan

*Attorney, Agent, or Firm*—McGlew & Tuttle

[57] ABSTRACT

Dressed materials for interior finish, the base material being wood, metal, resin, paper or glass, having a mixed pattern on the surface formed by a mixture of undercoating of water paint, or a mixture of water paint and oil paint, and overcoating having a nature different from that of the undercoating. Dressed materials resembling natural materials having a natural feeling of taste and pattern such as, marbling, a pattern of granite or the like are obtained.

13 Claims, 1 Drawing Sheet

METHOD FOR MAKING DRESSED MATERIALS AND SAID DRESSED MATERIALS

Background of the Invention

1. Field of the Invention

This invention relates to a method for making synthetic dressed materials (hereinafter referred to dressed materials) suitable for interior finish which are substituting for natural materials, and said dressed materials.

Also, this invention relates to a method for making vitreous dressed materials suitable for interior finish which are substituting for natural materials and said vitreous dressed materials.

2. Description of the Prior Art

Conventionally, dressed materials for interior finish which are intended to have a color and taste of various types of natural materials have been known. The conventional dressed materials have been mostly made by printing on the surface of the base material so as to provide a color and taste of natural materials.

Also, conventionally, the vitreous dressed materials for interior finish which are intended to have a color and taste of natural materials have been known. The conventional vitreous dressed materials have been mostly made by printing on the surface of the base material so as to provide a color and taste of natural materials.

However, the conventional dressed materials and vitreous dressed materials having been printed on a surface of the base material with an artificial pattern, color or taste to have a feeling of natural materials are not capable of creating real natural pattern, color or taste of natural materials, thus, the conventional dressed materials are often regarded as imitation or substitution. Particularly, it has been difficult to represent a pattern or taste fit on a glass surface of the vitreous base material.

SUMMARY OF THE INVENTION

It is an object of the invention to provide dressed materials having a pattern, color and taste of natural feeling resembling real natural materials.

It is another object of the invention to provide vitreous dressed materials having a pattern, color and taste of natural feeling resembling real natural materials.

Accordingly, the present invention has been made by the inventor in view of the disadvantage of the prior art that the artificial pattern, color or taste produced by printing is so much exact that it causes unnatural feeling all the more, while taking notice of the fact obtained by the various experiments that the intended dressed materials are made by applying coating materials having been worked by each other to create a natural taste of color or feeling on the surface of the base material.

The present invention is made to achieve the foregoing objects. The base material can be in a form of a sheet or plate of wood, metal, resin or paper. A surface preparation is made on the surface of the base material, then, water paint is applied covering the surface of the foundation to form an undercoating layer, then, further, a mixture of water paint and oil paint of a color different from the color of the base layer is applied with a brush on the random part of the surface of the undercoating layer to form a pattern layer, and, further, transparent coating is applied to cover all the surface of the undercoating and pattern layers to form a surface layer.

Further, the base material of the present invention can be in a form of a sheet or plate of wood, metal, resin or paper. A surface preparation is made on the surface of the base material, then, a mixture of water paint and oil paint is applied as an undercoating, soon after the undercoating application, resin coating of a color different from the color of the undercoating is applied by a spray to form a pattern and color produced by mixture of the undercoating and the overcoating.

Still further, the base material of the present invention can be a vitreous plate. After the foul and oil slick having been removed, the surface of the foundation is subject to an undercoating with a paint mixture of water paint and oil paint. Soon after the undercoating application, water is sprayed to form a pattern of mixture of undercoating and water, while the oil part is causing the repelling of water having a color different from that of the undercoating is prepared.

The above objects and other related objects, advantages, features and uses will be apparent by reference to the following detailed description when considered in connection with the accompanying drawings.

DESCRIPTION OF THE PREFERRED EMBODIMENTS

Example 1

Figure 1:
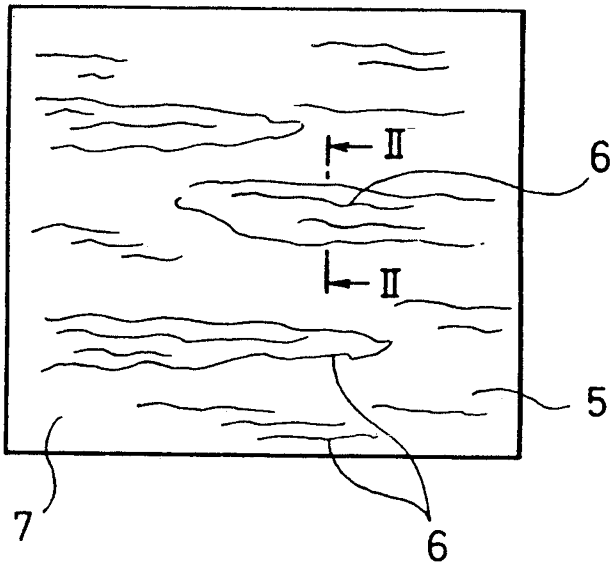
FIG. 1 is a plan view of the first embodiment of dressed materials.
Figure 2:
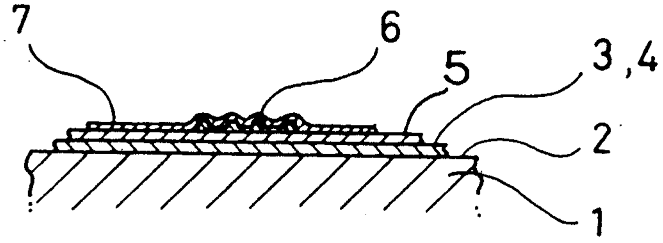
FIG. 2 is an enlarged partial sectional view along with the line indicated by the arrows of II in FIG. 1.

A base material of dressed materials can be selected from wood, metal, resin and paper and the surface of a sheet or a plate of the selected material has been first made a surface preparation which is to obtain a flat face and fit for paint to be coated. For a coating material of the selected wooden base material, lacquer putty and surfacer were applied as the surface preparation.

Water paint was applied evenly on the surface of the base material to form an undercoating layer in preparation for the subsequent pattern layer. For the water paint, which should have a color and taste according to the intended feeling of the natural material, acrylic resin coating was preferable.

A pattern layer was then formed by brush application of a mixture of water paint and oil paint on the random part of the undercoating layer, the color of which being different from that of the undercoating layer. The mixture of water paint and oil paint, each having a different characteristic and the brush application adopted here were together representing a variety of patterns with naturally mixed colors and natural feeling at the brushed portion having been worked by the two types of paint as the paint never fits each other easily. Several times of brush application can represent a desired shade of color. Thus mentioned brush application is particularly effective for forming a pattern layer of marbling.

The surface layer was then further formed by the application of transparent coating on the surface of the undercoating layer and the pattern layer. The surface layer serves as a finish layer to protect the pattern layer. Polyurethane resin coating was preferably used as the transparent coating.

Referring now to the drawings, plywood 1 was selected as a base material. A foundation surface 2 was coated with lacquer putty coating 3 and lacquer surfacer coating 4 as a surface preparation. Water acrylic resin coating was then applied on all the surface to form an undercoating layer 5. For the water acrylic resin coating, EMBI 50 (trade name, the manufacturer: Shinto Paint), the color being white was used and applied by spray application.

Further, on the random part of the surface of the undercoating layer 5, a mixture of water paint and oil paint, the color being different from that of the undercoating layer 5 was applied with a brush to form a pattern layer 6. For the water paint, water based paint was used and for the oil paint, alkyd resin coating, the color being brown was used. The brush, the material of which being pig hair, the width being about 8 cm and the thickness being 0.8 mm was used.

Finally, a transparent coating was applied covering the surface of the undercoating layer 5 and the pattern layer 6 to form a surface layer 7. For the transparent coating, matted polyurethane resin coating (the manufacturer: Cashew Co., Ltd.) was sprayed.

As a result, marbling with the color and feeling very much resembling the real natural material has been formed on the surface of the plywood 1.

EXAMPLE 2

The same base material as the first example was selected for the base material and a surface preparation was made in the same manner as the first example. A mixture of water paint and oil paint was applied on the surface of the base material to form an undercoating layer by spraying evenly on the surface, where a pattern extending rather wide.

Then, a resin coating, the color being different from that of undercoating, for example, black for the undercoating and white for the overcoating, was applied soon after the undercoating was sprayed, within a few minutes. The overcoating was preferably applied by a spray with a maximum output quanity of paint and with reduced air, so-called "Tamabuki." Thus sprayed paint was merged into the undercoating to form a mixed pattern layer having a mixed color. In accordance with the above method of applying coating, dressed materials with a pattern layer of random patterns such as crepe, a pattern of granite or a pattern of dried grass are produced.

More particularly, plywood was selected as a base material and the surface of the foundation was coated with lacquer putty and lacquer resin surfacer. Water acrylic resin coating was then applied to cover all the surface.

Then, a mixture of water paint and oil paint was sprayed once evenly on the surface. For the water paint, water based paint and for the oil paint, alkyd resin coating, the color being black were used to form the layer.

Two minutes after the foregoing undercoating, overcoating, acrylic-urethane resin coating, the color being white was applied. The overcoating was applied by a spray with a maximum output quanity of paint and reduced air, so-called "Tamabuki."

In accordance with the method of coating, dressed materials, the color and taste being quite resembling natural materials, having a pattern layer with a pattern of granite, the color being a mixture of white and black were obtained.

EXAMPLE 3

A vitreous plate was selected as a base material in the third example. The surface of the base material may be flat, uneven, or decorated with some patterns, however, the surface on which the undercoating and water sprayed in the method mentioned later can be mixed easily should be preferably used.

Then, the fouling and oil slick were removed from the surface of the base material. A mixture of water paint and oil paint was applied on the surface of the base material either with a spray or a brush to form an undercoating layer, soon after that, water was sprayed. The method of spraying water produced a quite natural and non-artifical pattern by sprayed water trying to merge into the undercoating while the oil part rejecting the water, and by the coating material dispersing and merging on the surface.

Then, a resin coating, the color being different from the color of undercoating was applied, for example, black for the undercoating and white for the overcoating. After the undercoating layer dried, the overcoating was applied several times.

More particularly, a vitreous plate was first cleaned removing the fouling and oil slick. A mixture of water paint and oil paint was applied on the surface of the base material. For the water paint, water based paint, and for the oil paint, alkyd resin coating, the color being black were used and applied by spray application.

Further, water was sprayed within a few minutes of the undercoating application. The quite natural and non-artificial random pattern was produced by the sprayed water pushing the undercoating toward the sprayed direction, trying to merge into the undercoating material while oil paint rejecting the water, and by the undercoating dispersing and merging on the surface in any directions, energized by the force of spraying.

After the above layer settled, a resin coating of white, a different color from the undercoating, was overcoated. Silicon resin coating was applied by spray application.

As a result, vitreous dressed materials representing a random pattern of black and white with a natural taste of color and feeling, resembling natural materials were obtained.

What is claimed is:

1. A method for making dressed materials, a base material of said dressed materials being a sheet or plate of wood, metal, resin or paper, comprising the steps of applying a surface preparation on said base materials, forming an undercoating layer by applying water paint on the surface of said base material, forming a pattern layer by applying a mixed paint of water paint and oil paint by brush application on the random part of said undercoating layer, the color of said mixed paint being different from the color of said undercoating layer, and forming a surface layer by applying a transparent coating over said undercoating layer and said pattern layer.

2. A method for making dressed materials as claimed in claim 1, wherein lacquer putty and surfacer are applied for wooden base materials as said surface preparation in said step of applying a surface preparation.

3. A method for making dressed materials as claimed in claim 1, wherein said undercoating layer in said step of forming an undercoating layer is formed by applying a water acrylic resin coating on the surface of said base material.

4. A method for making dressed materials as claimed in claim 2, wherein said undercoating layer in said step of forming an undercoating layer is formed by applying a water acrylic resin coating on the surface of said base materials.

5. A method for making dressed materials as claimed in any one of claim 1 or claim 2 or claim 3 or claim 4, wherein a polyurethane resin coating is used as said transparent coating in said step of forming a surface layer.

6. A method for making dressed materials as claimed in any one of claim 1 or claim 2 or claim 3 or claim 4, wherein said pattern layer in said step of forming a pattern layer has a pattern of marbling.

7. A method for making dressed materials as claimed in claim 5, wherein said pattern layer in said step of forming a pattern layer is a marbling pattern.

8. A method of making dressed materials, a base material of said dressed materials being a sheet or plate of wood, metal, resin or paper, comprising the steps of applying a surface preparation on said base material, forming an undercoating layer by applying mixed paint water paint and oil paint on the surface of said base material, and, forming a pattern layer with a pattern and color formed by mixture of said undercoating and an overcoating by applying resin coating material, the color being different from the color of said undercoating, by spray application soon after said undercoating application.

9. A method for making dressed materials as claimed in claim 8, wherein lacquer putty and a surfacer are used for wooden base materials as said surface preparation in said step of applying a surface preparation.

10. A method of making dressed materials as claimed in claim 8, wherein said undercoating in said step of forming an undercoating is black and said overcoating is white and said overcoating is applied within a few minutes of said undercoating application.

11. A method for making dressed materials as claimed in claim 9, wherein said undercoating is black and said overcoating is white and said overcoating is applied within a few minutes of said undercoating application.

12. A method for making dressed materials as claimed in any one of claim 8 or claim 9 or claim 10 or claim 11, wherein said overcoating is sprayed with maximum output quantity of paint and reduced air.

13. A method for making vitreous dressed materials, a base material of said vitreous dressed materials being a plate of glass comprising the step of removing foul and oil slick from the surface of said base material, forming an undercoating layer by applying mixture of water paint and oil paint on the surface of said base material, forming a pattern layer by mixing said undercoating and water sprayed soon after said undercoating application while oil paint in the undercoating repelling sprayed water, and forming a surface layer by applying overcoating, the color being different from the color of said undercoating.

* * * * *